United States Patent
Rodriguez Bravo et al.

(10) Patent No.: US 11,010,466 B2
(45) Date of Patent: May 18, 2021

(54) KEYBOARD INJECTION OF PASSWORDS

(71) Applicant: International Business Machines Corporation, Armonk, NY (US)

(72) Inventors: Cesar Augusto Rodriguez Bravo, San Rafael de Alajuela (CR); John R. Feezell, Pikeville, TN (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 16/120,585

(22) Filed: Sep. 4, 2018

(65) Prior Publication Data

US 2020/0074069 A1    Mar. 5, 2020

(51) Int. Cl.
| | | |
|---|---|---|
| G06F 21/00 | (2013.01) | |
| G06F 21/45 | (2013.01) | |
| G06F 21/60 | (2013.01) | |
| G06F 21/35 | (2013.01) | |
| G06F 21/32 | (2013.01) | |

(52) U.S. Cl.
CPC .............. *G06F 21/45* (2013.01); *G06F 21/32* (2013.01); *G06F 21/35* (2013.01); *G06F 21/602* (2013.01)

(58) Field of Classification Search
CPC .......... G06F 21/45; G06F 21/32; G06F 21/35; G06F 21/602
See application file for complete search history.

(56) References Cited

U.S. PATENT DOCUMENTS

| | | |
|---|---|---|
| 7,907,542 B2 | 3/2011 | Smith |
| 8,090,945 B2 | 1/2012 | Singhal |
| 8,171,531 B2 | 5/2012 | Buer |
| 8,213,908 B2 | 7/2012 | Sangster et al. |
| 8,245,292 B2 | 8/2012 | Buer |
| 8,307,412 B2 | 11/2012 | Ozzie et al. |
| 8,386,795 B2 | 2/2013 | Lu et al. |
| 8,707,452 B1 * | 4/2014 | Block ................. G06F 21/41 726/28 |
| 8,812,864 B2 | 8/2014 | Adams et al. |
| 8,910,274 B2 | 12/2014 | Sanders |
| 8,924,734 B2 | 12/2014 | Riell |
| 9,370,640 B2 | 6/2016 | Zhang et al. |

(Continued)

FOREIGN PATENT DOCUMENTS

| | | |
|---|---|---|
| CN | 2667807 Y | 12/2004 |
| CN | 101150409 A | 3/2008 |

(Continued)

OTHER PUBLICATIONS

Boukayoua, Faysal et al.; "A Keyboard that Manages Your Passwords in Android"; https://msec.be/secureapps/onderzoeksresultaten/secure_mobile_password_manager.pdf, pp. 1 & 2.

(Continued)

*Primary Examiner* — John B King
(74) *Attorney, Agent, or Firm* — William H. Hartwell (57) ABSTRACT

The disclosure is directed to the keyboard injection of passwords from a password vault application on a mobile computing device to a computing system coupled to the keyboard. A method according to embodiments includes: wirelessly receiving a password at a physical keyboard; and transmitting the password from the keyboard to a computing system.

16 Claims, 7 Drawing Sheets

(56) References Cited

U.S. PATENT DOCUMENTS

| | | | |
|---|---|---|---|
| 9,374,369 | B2 | 6/2016 | Mahaffey et al. |
| 9,402,179 | B1* | 7/2016 | Miller .................. H04W 12/06 |
| 9,565,181 | B2 | 2/2017 | Brown |
| 9,729,520 | B2 | 8/2017 | Barton et al. |
| 9,848,324 | B1* | 12/2017 | Abene .................. H04W 12/06 |
| 10,025,952 | B1* | 7/2018 | Wang .................. G06F 21/6245 |
| 2006/0105712 | A1 | 5/2006 | Glass et al. |
| 2006/0119707 | A1* | 6/2006 | Merrell .............. H04N 21/4307 |
| | | | 348/207.99 |
| 2007/0250920 | A1* | 10/2007 | Lindsay ................ G07F 7/1025 |
| | | | 726/7 |
| 2008/0148057 | A1 | 6/2008 | Hauw |
| 2009/0222908 | A1 | 9/2009 | Warren |
| 2009/0319782 | A1* | 12/2009 | Lee ........................ G06F 21/575 |
| | | | 713/156 |
| 2010/0287381 | A1* | 11/2010 | Dick ........................ G06F 21/45 |
| | | | 713/185 |
| 2012/0060213 | A1* | 3/2012 | Childress ................ G06F 21/31 |
| | | | 726/18 |
| 2012/0079513 | A1* | 3/2012 | Nahata ............... H04N 21/2668 |
| | | | 725/5 |
| 2012/0323717 | A1* | 12/2012 | Kirsch ............... G06Q 20/0855 |
| | | | 705/26.1 |
| 2013/0031623 | A1 | 1/2013 | Sanders |
| 2014/0109200 | A1* | 4/2014 | Tootill .................... G06F 21/32 |
| | | | 726/5 |
| 2014/0189808 | A1* | 7/2014 | Mahaffey .......... H04W 12/0609 |
| | | | 726/4 |
| 2014/0215356 | A1* | 7/2014 | Brander .................... G06F 3/14 |
| | | | 715/753 |
| 2014/0281549 | A1* | 9/2014 | Pemmaraju ........... H04W 12/04 |
| | | | 713/171 |
| 2014/0282978 | A1* | 9/2014 | Lerner .................. H04L 63/083 |
| | | | 726/7 |
| 2014/0298432 | A1 | 10/2014 | Brown |
| 2014/0365214 | A1* | 12/2014 | Bayley .................... G10L 15/26 |
| | | | 704/235 |
| 2014/0368865 | A1* | 12/2014 | Gutnik .................. G06F 3/1267 |
| | | | 358/1.15 |
| 2014/0380445 | A1* | 12/2014 | Tunnell .................. H04L 63/18 |
| | | | 726/7 |
| 2016/0087792 | A1* | 3/2016 | Smith ..................... H04L 9/085 |
| | | | 380/278 |
| 2016/0285633 | A1* | 9/2016 | Allinson .................. G06F 21/34 |
| 2016/0373420 | A1 | 12/2016 | Dvorak |
| 2017/0068814 | A1 | 3/2017 | Childress et al. |
| 2017/0102845 | A1* | 4/2017 | Ozuysal .................. G06F 40/14 |
| 2017/0249450 | A1* | 8/2017 | Lawrenson ............. G06F 21/36 |
| 2019/0065405 | A1* | 2/2019 | Gotze ................. G06F 12/1408 |
| 2019/0163893 | A1 | 5/2019 | Rodriguez Bravo |
| 2019/0370456 | A1* | 12/2019 | Abbasian ................ G06F 21/41 |

FOREIGN PATENT DOCUMENTS

| | | |
|---|---|---|
| CN | 100576798 C | 12/2009 |
| CN | 106375304 A | 2/2017 |
| CN | 106452763 A | 2/2017 |
| WO | 2014145186 A1 | 9/2014 |
| WO | 2019106498 A1 | 6/2019 |

OTHER PUBLICATIONS

Vultur, Horatiu-Laurentiu; "Password Managers"; http://projekter.aau.dk/projekter/files/239482329/Password_Manager.pdf, May 2016, pp. 20 & 21.

Park, John; "Password Vault"; https://learn.adafruit.com/adabox007/password-vault, pp. 2 & 3.

Unknown; "LastPass Pawword Manger"; LastPass Password Manager—Android Apps on Google Play; Printed Sep. 25, 2017; pp. 4; <http://play.google.com/store/apps/details?id=com.lastpass.ipandroid&hl=en>.

International Search Report and Written Opinion dated Mar. 4, 2019 for PCT/IB2018/059216 filed Nov. 22, 2018; pp. 8.

Non Final Office Action dated Jun. 26, 2019 for U.S. Appl. No. 15/826,821, filed Nov. 30, 2017; pp. 27.

De Ru et al., "Enhanced Password Authentication Through Fuzzy Logic," IEEE Expert, Nov./Dec. 1997, pp. 38-45, © 1997 IEEE.

Rodriguez Bravo et al., "Wireless Injection of Passwords" U.S. Appl. No. 16/807,906, filed Mar. 3, 2020, 26 pages.

* cited by examiner

KEYBOARD INJECTION OF PASSWORDS

TECHNICAL FIELD

The present invention relates generally to computer security, and more particularly, to a method, system, computer program product, and keyboard for the keyboard injection of passwords from a password vault application on a mobile computing device to a computing system coupled to the keyboard.

BACKGROUND

A password is a word or string of characters used for user authentication to prove identity or access authentication to gain access to a resource (e.g., a computer device). A password, although very vulnerable to hacking, is still the most common method for authentication. Recent studies have confirmed that the worst passwords are in fact the most commonly used. For example, the passwords "12345," "password," "qwerty," and "letmein" are some of the widely used passwords around the world.

Other authentication methods, such as fingerprint or facial recognition, have also been employed, but have proven to be less than 100% secure. Multi-factor authentication, as well as smart cards and other hardware-based authentication devices, have also been developed.

A password vault application assists in generating and retrieving complex passwords, potentially storing such passwords in an encrypted database, or calculating them on demand. Types of password vault applications may include, for example, locally installed software applications, online services accessed through website portals, or locally accessed hardware devices that serve as keys. Depending on the type of password manager used and on the functionality offered by its developers, the encrypted database is either stored locally on a user's device (e.g., mobile device or computer device) or stored remotely through an online file-hosting service. Password vault applications typically require a user to generate and remember one "master" password to unlock and access any information stored in their databases.

SUMMARY

An aspect of the disclosure provides a method for injecting passwords, including: wirelessly receiving a password at a physical keyboard; and transmitting the password from the keyboard to a computing system.

Another aspect provides a computer program product stored on a computer readable storage medium, which when executed by a computing system, performs a method for injecting passwords, the method including: wirelessly receiving a password at a physical keyboard; and transmitting the password from the keyboard to a computing system.

Another aspect provides a method for injecting passwords, including: retrieving a password from a password vault application on a mobile computing device; and transmitting the password from the mobile computing device to a physical keyboard using a wireless protocol.

Another aspect provides a computer program product stored on a computer readable storage medium, which when executed by a computing system, performs a method for injecting passwords, the method including: retrieving a password from a password vault application on a mobile computing device; and transmitting the password from the mobile computing device to a physical keyboard using a wireless protocol.

Another aspect provides a physical keyboard, including: a connectivity module for receiving a wirelessly transmitted password; and a conversion module for converting the password to a format emulating a corresponding typed output of the physical keyboard.

Another aspect provides a keyboard system including: a physical keyboard; and an injection module coupled to the keyboard, the injection module: receiving a wirelessly transmitted password; and converting the password to a format emulating a corresponding typed output of the keyboard.

Other aspects provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description taken in conjunction with the accompanying drawings that depict various aspects of the invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The present invention relates generally to computer security, and more particularly, to a method, system, computer program product, and keyboard for the keyboard injection of passwords from a password vault application on a mobile computing device to a computing system coupled to the keyboard.

According to embodiments, any type of physical keyboard, regardless of the communication protocol used by the keyboard (e.g., USB, PS/2, Bluetooth® (a registered trademark of Bluetooth SIG), etc.) may be configured to inject passwords provided by a password vault application on a mobile computing device to a computing system coupled to the keyboard. The keyboard may have a direct (e.g., wired) connection or may be wirelessly coupled to the computing system. The keyboard does not require proprietary software as with some known authentication methods, and can be used across all operating systems and hardware platforms.

Figure 1:
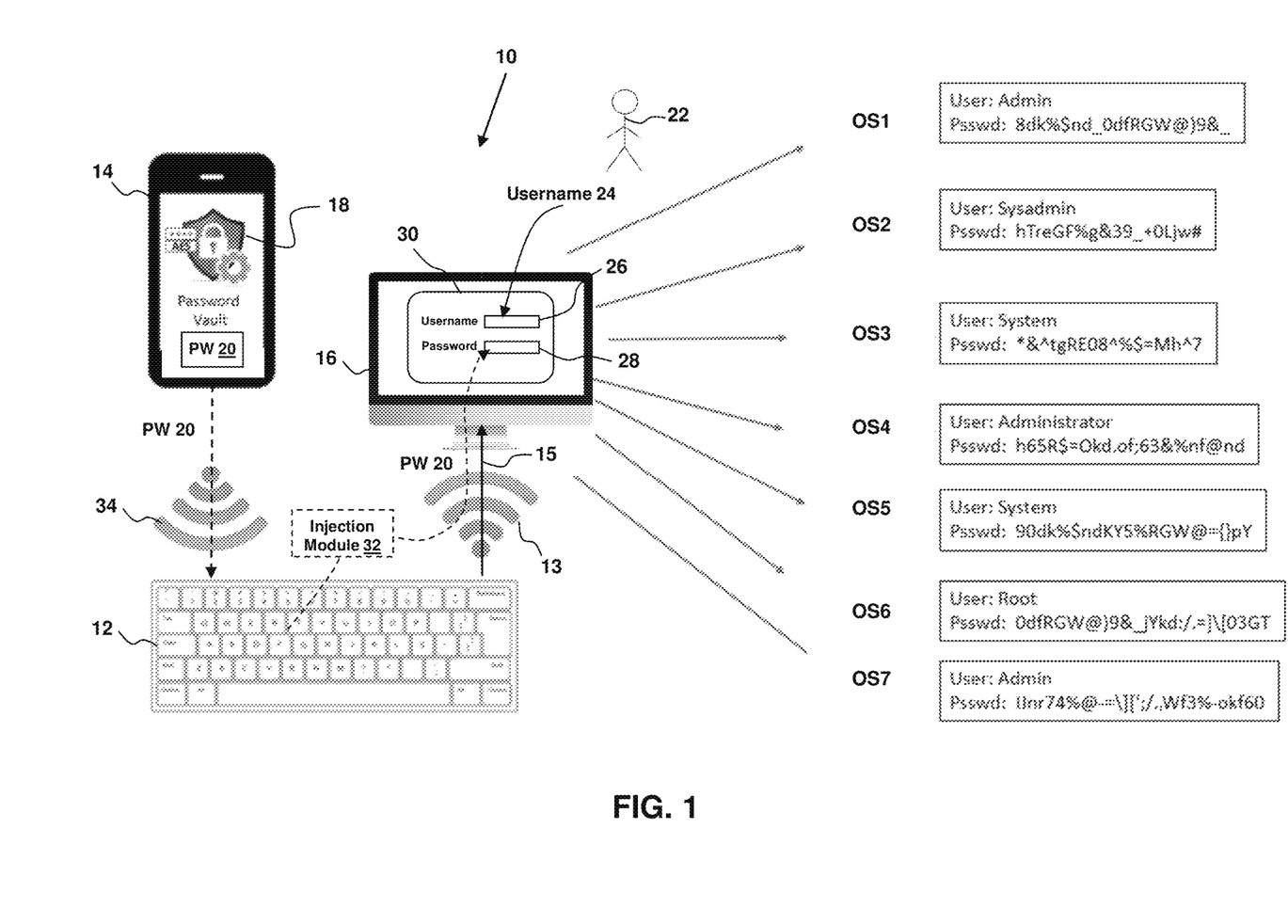
FIG. 1 depicts a system including a keyboard for injecting passwords according to embodiments.

FIG. 1 depicts a system 10 including a keyboard 12 for automatically injecting passwords provided by a mobile computing device 14 into one or more computing systems 16 (only one shown in FIG. 1) according to embodiments. The keyboard 12 is shown in FIG. 1 as having a wireless connection 13 to the computing system 16. However, as described above, the keyboard 12 may alternatively be coupled to the computing system via a wired connection 15.

The mobile computing device 14 may include, for example, any computing device that is small enough to hold and operate in the hand of a user, or which can be worn by the user. A non-limiting set of examples of mobile computing devices includes mobile phones (e.g., smartphones), tablets, laptop computers, mobile internet devices, and wearable computers including smartwatches and head-mounted displays.

The mobile computing device 14 includes a password vault application 18, which is used to securely manage, store, and retrieve passwords for logging into one or more computing systems 16. The password vault application 18 may include any now known or later developed password vault application 18 capable of storing and outputting a password (PW) 20 as described herein.

As depicted in FIG. 1, logging into the computing system 16 typically involves a user 22 entering a username 24 and associated password into corresponding username and password fields 26, 28 presented, for example, on a log-in screen 30. According to embodiments, the keyboard 12 includes an injection module 32 for injecting a password 20 received from the password vault application 18 into the password field 28 of the log-in screen 30 on the computing system 16. The injection module 32 may be an internal component of the keyboard 12 as shown, or may be an external component coupled to the keyboard 12. In the latter case, the injection module 32 may coupled to the keyboard 12 via any suitable wireless and/or wired connection. Advantageously, the keyboard 12 with the injection module 32 may be used with any credential challenge to inject a password 20 received from the password vault application 18 into a password field 28 including, for example, password fields 28 associated with the BIOS(s) and OS(s) used by the computing device 16, password fields 28 associated with applications (e.g., email, word processors, etc.) running on the computing device 16, and password fields used to sign on to web pages, remote servers, and/or the like. Examples of different users 22 using different passwords 20 to log into different OSs on the computing system 16 are depicted on the right hand side of FIG. 1.

The password 20 is transmitted from the password vault application 18 on the mobile computing device 14 to the injection module 32 of the keyboard 12 using a wireless communication protocol 34 such as, for example, near-field communication (NFC), Bluetooth® (a registered trademark of Bluetooth SIG), infrared, ZigBee® (a registered trademark of Zigbee Alliance), WiFi® (a registered trademark of WiFi Alliance), cellular, and/or the like. Any suitable now known or later developed wireless communication protocol 34 capable of transmitting data between a mobile computing device and a keyboard may be used.

Figure 2:
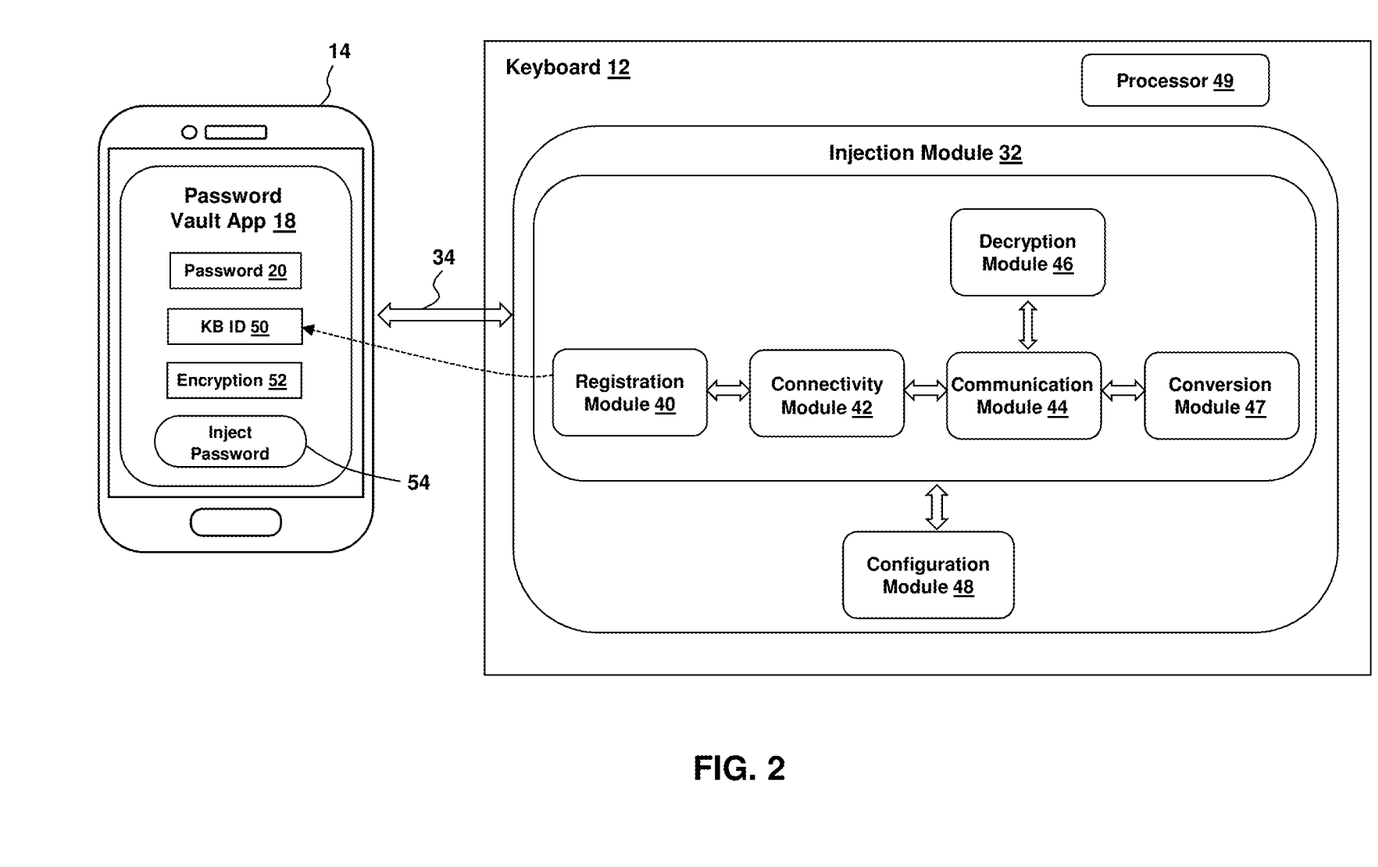
FIG. 2 depicts an injection module of the keyboard of FIG. 1 in greater detail according to embodiments.

FIG. 2 depicts the injection module 32 of FIG. 1 in greater detail. In general, the injection module 32 includes a registration module 40, a connectivity module 42, a communication module 44, a decryption module 46, and a configuration module 48.

The registration module 40 handles the registration (e.g., pairing) of the keyboard 12 and the mobile computing device 14 (and/or the password vault application 18 on the mobile computing device 14). This may include, for example, the registration module 40 providing a serial number or other identifier 50 of the keyboard 12 to the password vault application 18 on the mobile computing device 14. Registration may be required before any communication of password data between the password vault application 18 on the mobile computing device 14 and the injection module 32 of the keyboard 12 is permitted.

The connectivity module 42 is in charge of communication between the password vault application 18 and the injection module 32 of the keyboard 12. The communication module 42 is configured to transmit data between the password vault application 18 and the injection module 32 of the keyboard 12 using one or more wireless communication protocols 34.

The password vault application 18 stores at least one password 20 for use in logging into one or more computing systems 16. A unique user and computer name combination may be used to index each of the passwords 20 in the password vault application 18. In a non-limiting example, with regard to the system 10 shown in FIG. 1, the user 22 has a username "1XXXX1" and password "@BCDEFGH!" for logging into a first computing system 16, which has a computer name of "comp1" and includes a first operating system (OS). The user 22 also has a username "1YYYY2" and password "JKLMNθP" for logging into a different computing system 16, which has a computer name of "comp2" and includes a second OS, different from the first OS. To this extent, the password vault application 18 used by the user 22 may index the passwords of the user 22 as follows:

| | |
|---|---|
| 1XXXX1, comp1 | @BCDEFGH!; and |
| 1XXXX2, comp2 | JKLMNθP!. |

Other indexing methodologies are also possible.

When logging into a computing system 16, the user 22 enters username "1XXXX1" into the username field 26 of computing system 16. The user 22 selects the user/computer name combination of the computing system 16 (e.g., 1XXXX1, comp1) stored by the password vault application 18 on his/her mobile computing device 14. When instructed, the password vault application 18 transmits the password 20 associated with the selected user/computer name combination (e.g., @BCDEFGH! in the above example) to the injection module 32 of the keyboard 12. The password vault application 18 may include an encryption module 52 for encrypting the password 20 at some point prior to transmission to the injection module 32 of the keyboard 12. Any suitable encryption methodology may be used by the encryption module 52 to encrypt the password 20. After receipt of the password 20 at the injection module 32 of the keyboard 12, the password 20 is decrypted (if necessary) by the decryption module 46.

The communication module 44 controls the communication of data between the various modules in the injection module 32 of the keyboard 12 and between injection module 32 and the processor(s) (or other components) of the keyboard 12. The configuration module 48 is provided to handle the configuration of the injection module 32 (e.g., security, encryption, decryption, connectivity, registration, and/or the like).

With continued reference to FIG. 2, the password vault application 18 further includes an "Inject Password" button 54 or other mechanism for initiating transfer of the password 20 to the injection module 32 of the keyboard 12. When the user 22 is ready to enter the password 20 into the password field 28 of the log-in screen 30 on the computing system 16, the user 22 actuates the Inject Password button 54. In response, the password vault application 18 wirelessly transmits the password 20 from the mobile computing device 14 to the injection module 32 of the keyboard 12.

Upon receipt (and decryption, if necessary) of the password 20, the keyboard 12 converts the text of the password 20 into a series of corresponding key codes or the like (e.g., using a character map or the like). For example, the injection module 32 may include a conversion module 47 to perform the necessary conversion. In another example, a processor 49 of the keyboard 12 may function as the conversion module 47. In either case, the password 20 received by the injection module 32 from the mobile computing device 14 is converted to a format emulating a corresponding typed output of the keyboard 12.

The keyboard 12 subsequently transmits data (e.g., binary data) corresponding to the key codes to the computing system 16 in a known manner. The computing system 16 converts the data to text and injects (enters) the text into the password field 28 of the log-in screen 30. The computing system 16 uses a standard keyboard driver (USB, PS2, Mini-Din, AT Port, etc.). With the username field 26 and password field 28 now filled in, the user 22 can securely log into the computing system 16. As far as the computing system 16 is concerned, the password data received from the keyboard 12 appears to have been generated by the actuation of the keys on the keyboard 12 by the user 22, rather than through the operation of the injection module 32. However, as disclosed herein, the password 20 is not typed on the keyboard 12; the password 20 instead passes securely through the keyboard 12 through operation of the injection module 32.

An optional personal identification number (PIN) (e.g., a 4 digit numeric code) may be appended (e.g., manually) to the injected password 20. This would add an additional layer of security if the password 20 itself is intercepted or the password vault application 18 is somehow compromised. Without the PIN, the password 20 would not be usable, as the PIN would be, in effect, another "something you know" factor of authentication. The PIN may, for example, be manually added by a user 22 to the end of the password 20 after the password 20 has been injected into the password field 28 of the log-in screen 30.

Figure 3:
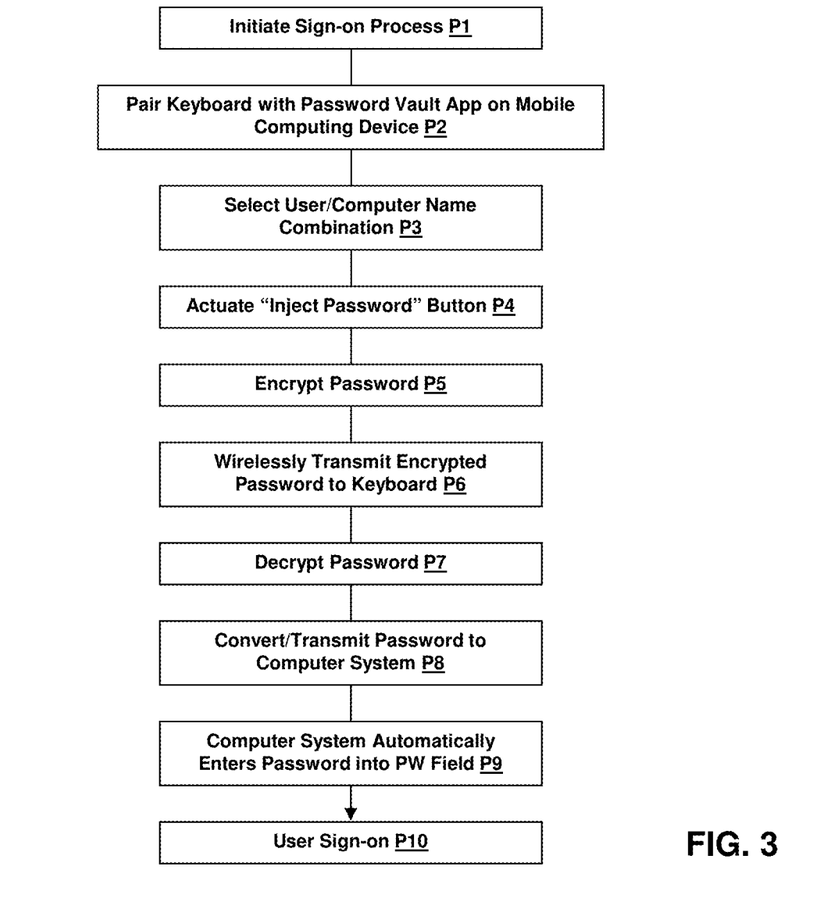
FIG. 3 depicts a process for the keyboard injection of passwords from a password vault application on a mobile computing device to a computing system coupled to the computing system according to embodiments.

FIG. 3 depicts a process for the keyboard injection of passwords from a password vault application on a mobile computing device to a computing system coupled to a keyboard according to embodiments. At P1, a user 22 initiates a sign-on process on a computing system 16. At P2, a keyboard 12 including an injection module 32 is paired with a password vault application 18 on a mobile computing device 14. At P3, the user 22 selects a user/computer name combination in the password vault application 18. At P4, the "Inject Password" button 54 is actuated to initiate a wireless transmission of a password 20 to the injection module 32 of the keyboard 12. At P5, prior to wireless transmission, the password 20 corresponding to the selected user/computer name may be encrypted by an encryption module 52 of the password vault application 18. At P6, the encrypted password 20 is wirelessly transmitted to the injection module 32 of the keyboard 12. At P7, the encrypted password 20 is decrypted (if necessary) by the decryption module 46 of the injection module 32. At P8, the injection module 32 of the keyboard 12 converts, or uses the processor of the keyboard 12 to convert, the text of the password 20 into a series of corresponding key codes (e.g., using a character map or the like). The keyboard 12 subsequently transmits data (e.g., binary data) corresponding to the key codes to the computing system 16. At P9, the computing system 16 converts the data to text and automatically injects (enters) the text into the password field 28 of the log-in screen 30. At P10, with the username field 26 and password field 28 now filled in, the user 22 can securely log into the computing system 16.

Figure 4:
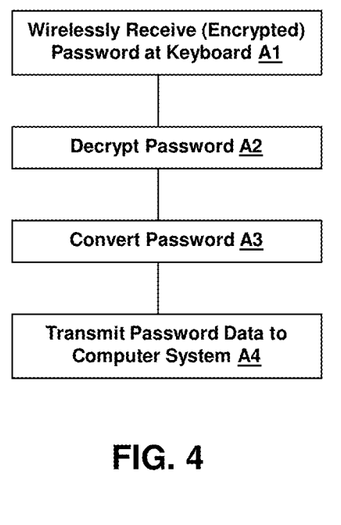
FIGS. 4-6 depict processes performed by a keyboard, mobile computing device, and computing system, respectively, when injecting a password from a password vault application on the mobile computing device to the computing system coupled to the keyboard according to embodiments.
Figure 5:
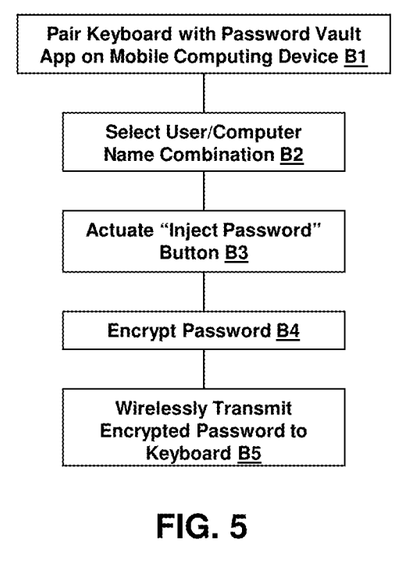
Figure 6:
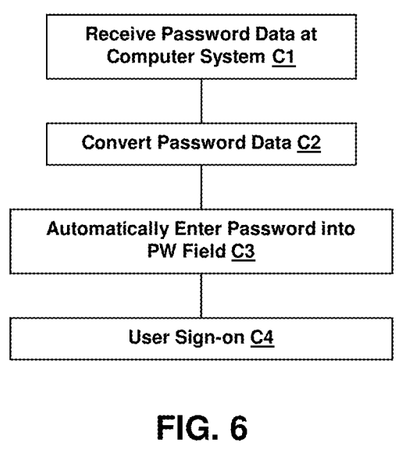

FIGS. 4-6 depict various general processes performed by the keyboard 12, mobile computing device 14, and computing system 16, respectively, when injecting a password 20 from the password vault application 18 on the mobile computing device 14 to the computing system 16 coupled to the keyboard 12, according to embodiments.

Referring to FIG. 4, at A1, the password 20 (possibly encrypted) is wirelessly received by the injection module 32 of the keyboard 12. At A2, the password 20 is decrypted (if necessary) by the decryption module 46 of the injection module 32. At A3, the injection module 32 of the keyboard 12 converts, or uses a processor of the keyboard 12 to convert, the text of the password 20 into a series of corresponding key codes (e.g., using a character map or the like). At A4, the keyboard 12 transmits the password data to the computer system 16.

Referring now to FIG. 5, at B1, the user 22 pairs the keyboard 12 including the injection module 32 with the password vault application 18 on the mobile computing device 14. At B2, in response to a user initiation of a sign-on process on the computing system 16, the user 22 selects the user/computer name combination of the computing system 16 stored by the password vault application 18 on the mobile computing device 14. At B3, the user 22 actuates the "Inject Password" button 54 to initiate a wireless transmission of the password 20 to the injection module 32 of the keyboard 12. At B4, prior to wireless transmission, the password 20 corresponding to the selected user/computer name may be encrypted by the encryption module 52 of the password vault application 18. At B5, the encrypted password 20 is wirelessly transmitted to the injection module 32 of the keyboard 12.

In FIG. 6, at C1, the computing system 16 receives the password data from the keyboard 12. At C2, the computing system 16 converts the password data to text, and at C3, automatically injects (enters) the text into the password field 28 of the log-in screen 30. At C4, with the username field 26 and password field 28 now filled in, the user 22 can securely log into the computing system 16.

According to embodiments, a keyboard 12 incorporating an injection module 32 can be used to wirelessly inject a password 20 from a password vault application 18 on a mobile computing device 14 to any type of computing system 16 coupled to the keyboard 12. This provides a true plug and play solution that can be used to log into almost any type of operating system on almost any type of computing system 16, since no additional drivers are required. This solution provides increased security, since a mobile computing device 14 is paired to a specific keyboard 12. By automatically injecting a password 20 via a keyboard 12 having an injection module 32, the risk of displaying a password 20 in clear text (e.g., on a mobile computing device 14) is avoided. The risk of being locked out of a computing system by entering an incorrect password is eliminated, and the need to remember and manually enter a very complex password is avoided (one purpose of using a password vault application 18 is to have complex passwords).

Figure 7:
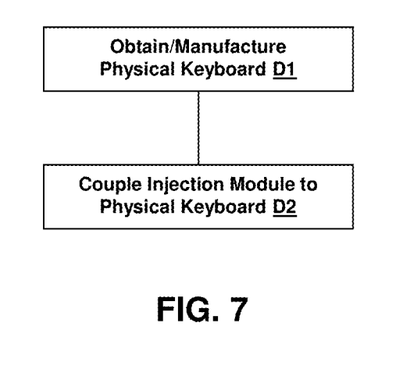
FIG. 7 depicts a process for modifying a physical keyboard according to embodiments.

FIG. 7 depicts a process for modifying a physical keyboard according to embodiments. At D1, a physical keyboard is obtained/manufactured. At D2, an injection module is coupled to the keyboard. The coupling of the injection module may Include, for example, modifying (e.g., retrofitting) an existing keyboard, or manufacturing a new keyboard, to include software and/or hardware configured to provide the functionality of the injection module as described herein.

Figure 8:
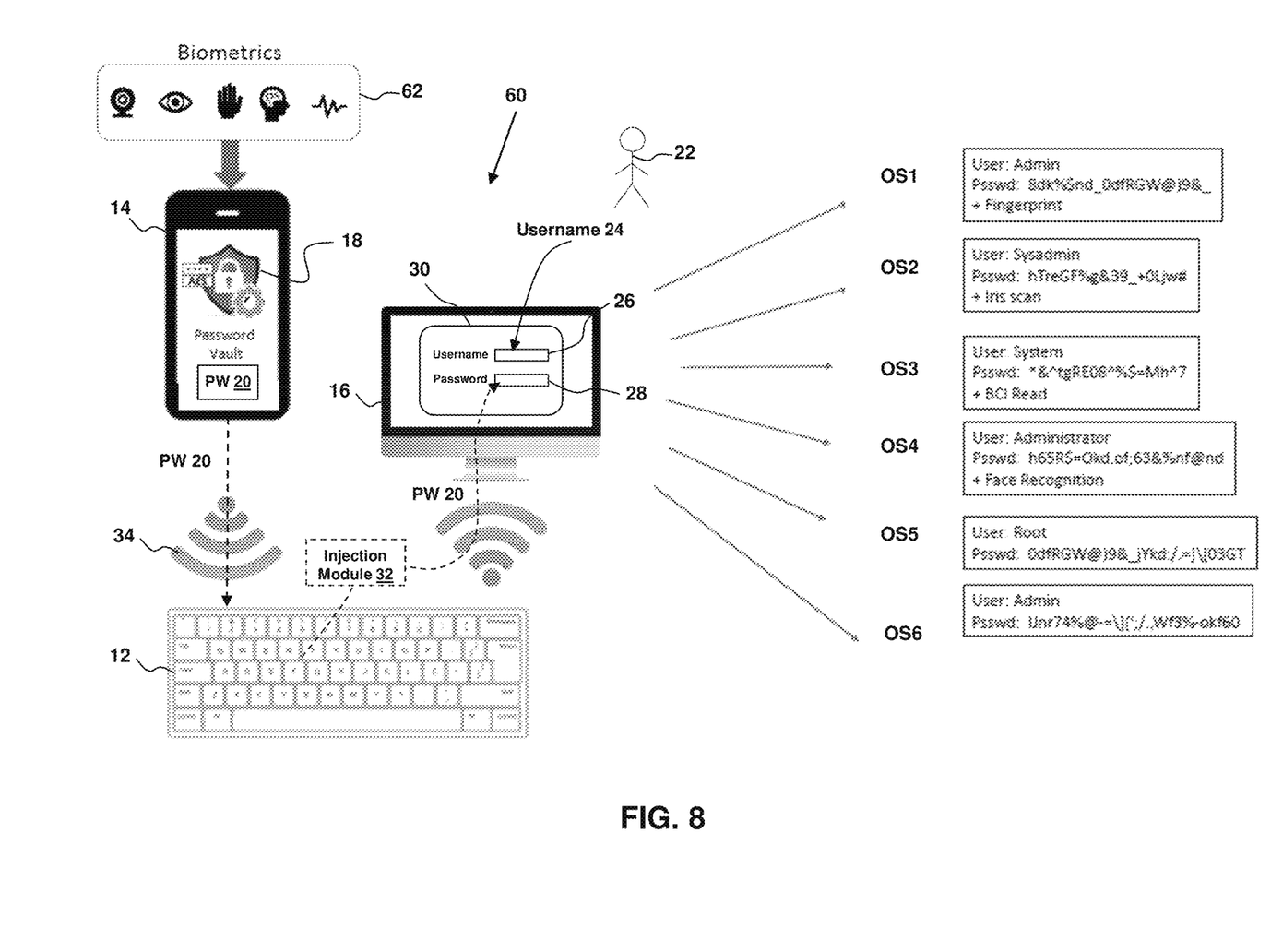
FIG. 8 depicts a system including a keyboard for injecting passwords and incorporating biometric authentication according to embodiments.

If the computing system 16 requires multifactor authentication, the user 22 may use the mobile computing device 14 as part of that validation. A system 60 including a keyboard 12 for injecting passwords 20 and incorporating biometric authentication according to embodiments is depicted in FIG. 8. In this example, the computing system 16 requires multifactor authentication. However, this process may be required by another computing system or server coupled to or remotely accessed by the computing system 16.

Biometric authentication is a security process that relies on the unique biological characteristic(s) of a user to verify the identity of the user. Biometric authentication systems compare captured biometric data capture to stored, confirmed authentic data in a database. If both samples of the biometric data match, authentication is confirmed.

The biological characteristic(s) may be provided, for example, via a retinal scan (to produce a representation of the blood vessel pattern in the light-sensitive surface lining the user's inner eye), an iris scan (to produce a representation of the unique patterns within the ring-shaped region surrounding the pupil of the eye), a fingerprint scan, a finger vein scan (to produce a representation of the unique vascular pattern in a user's finger), an image of the face of the user for facial recognition, a voice sample for voice recognition, etc. Many other types of biological characteristic(s) may also be used.

If the computing system 16 requires 2-factor authentication, for example, the user 22 can use the mobile computing device 14 to capture at least one biological characteristic 62 of the user 22 (e.g., a fingerprint of the user 22). Once captured, the biological characteristic 62 can be validated, for example, by the mobile computing device 14 (or a web service). The mobile computing device 14 (or web service) then sends a validation token to the computing system 16. Receipt of the validation token by the computing system 16 is required before the password field 28 is filled in with the password 20 provided by the keyboard 12. Examples of different users 22 using different passwords 20 and biological characteristic to log into different OSs on the computing system 16 are depicted on the right hand side of FIG. 8.

The present invention may be a keyboard, system, method, or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computing system via a storage medium such as a CD, DVD, etc., the program product may also be automatically or semi-automatically deployed into a computing system by sending the program product to a central server or a group of central servers. The program product may then be downloaded into client computers that will execute the program product. Alternatively the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

Figure 9:
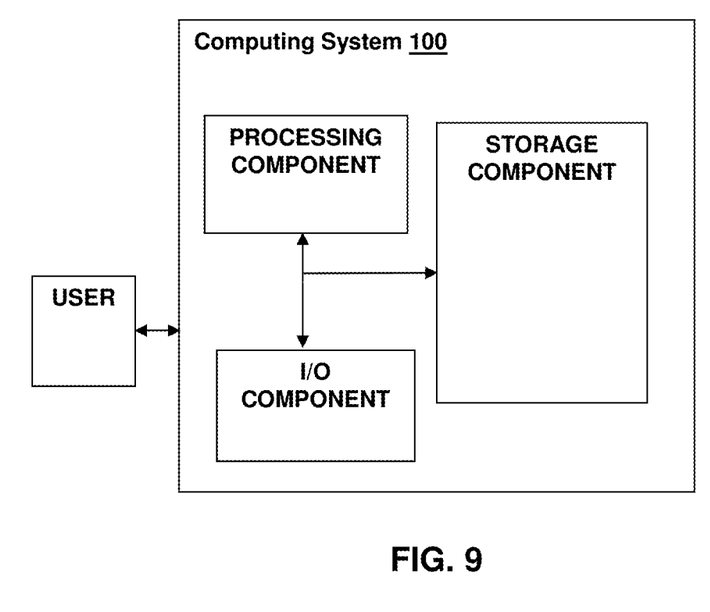
FIG. 9 depicts a processing system for the keyboard injection of passwords according to embodiments.

FIG. 9 depicts an illustrative processing system 100 (e.g., within a mobile device) for implementing various aspects of the present invention, according to embodiments. The processing system 100 may comprise any type of computing system and, and for example includes at least one processor, memory, an input/output (I/O) (e.g., one or more I/O interfaces and/or devices), and a communications pathway. In general, processor(s) execute program code, which is at least partially fixed in memory. While executing program code, processor(s) can process data, which can result in reading and/or writing transformed data from/to memory and/or I/O for further processing. The pathway provides a communications link between each of the components in processing system 100. I/O can comprise one or more human I/O devices (e.g., keyboard 12, FIG. 1), which enable a user to interact with processing system 100.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

What is claimed is:

1. A method for injecting passwords, comprising:
wirelessly receiving a password at a physical keyboard, the password received via a wireless protocol from a mobile computing device having a password vault application;
converting the password into a series of corresponding key codes;
transmitting data corresponding to the series of key codes from the keyboard to a computing system;
identifying actuation of one or more physical buttons of the keyboard, the one or more physical buttons having respective key codes; and
transmitting data corresponding to the respective key codes of the one or more physical buttons from the keyboard to the computing system,
wherein at least the wireless receiving of the password at the physical keyboard, the converting of the password into the series of corresponding key codes, and the transmitting of the data corresponding to the series of key codes from the keyboard to the computing system are performed without displaying the password.

2. The method of claim 1, wherein the keyboard is coupled to the computing system using a wireless or wired connection.

3. The method of claim 1, further comprising pairing the keyboard with a mobile computing device.

4. The method of claim 3, wherein the pairing is performed prior to the keyboard receiving the password.

5. The method of claim 1, further comprising decrypting the password at the keyboard.

6. The method of claim 1, further including using the password in a multifactor authentication process including biometric authentication.

7. A computer program product stored on a computer readable storage medium, which when executed by a computing system, performs a method for injecting passwords, the method comprising:
wirelessly receiving a password at a physical keyboard, the password received via a wireless protocol from a mobile computing device having a password vault application;
converting the password into a series of corresponding key codes;
transmitting data corresponding to the series of key codes from the keyboard to a computing system;

identifying actuation of one or more physical buttons of the keyboard, the one or more physical buttons having respective key codes; and transmitting data corresponding to the respective key codes of the one or more physical buttons from the keyboard to the computing system, wherein at least the wireless receiving of the password at the physical keyboard, the converting of the password into the series of corresponding key codes, and the transmitting of the data corresponding to the series of key codes from the keyboard to the computing system are performed without displaying the password.

8. The computer program product of claim 7, wherein the method further includes pairing the keyboard with a mobile computing device prior to the keyboard receiving the password.

9. The computer program product of claim 7, wherein the method further includes decrypting the password at the keyboard.

10. A physical keyboard, comprising:

a plurality of physical buttons;

one or more computer processors; and a computer readable storage medium having program instructions embodied therewith, wherein the program instructions, when executed by the one or more computer processors, cause the physical keyboard to perform a method comprising:

wirelessly receiving a password, via a wireless protocol, from a mobile computing device having a password vault application;

converting the password into a series of corresponding key codes;

transmitting data corresponding to the series of key codes from the physical keyboard to a computing system;

identifying actuation of one or more physical buttons of the physical keyboard, the one or more physical buttons having respective key codes; and transmitting data corresponding to the respective key codes of the one or more physical buttons from the physical keyboard to the computing system, wherein at least the wireless receiving of the password, the converting of the password into the series of corresponding key codes, and the transmitting of the data corresponding to the series of key codes from the physical keyboard to the computing system are performed without displaying the password.

11. The keyboard of claim 10, further including a wireless or wired connection to a computing system.

12. The keyboard of claim 11, wherein the keyboard transmits the password to the computing system via the wireless or wired connection.

13. The keyboard of claim 10, wherein the method further comprises decrypting the password.

14. The keyboard of claim 10, wherein the method further comprises pairing the keyboard with a mobile computing device.

15. A keyboard system, comprising:

a physical keyboard including a plurality of physical buttons; and an injection module coupled to the keyboard, the injection module configured to perform a method comprising:

receiving a wirelessly transmitted password, via a wireless protocol, from a mobile computing device having a password vault application;

converting the password into a series of corresponding key codes;

transmitting data corresponding to the series of key codes from the physical keyboard to a computing system;

identifying actuation of one or more physical buttons of the physical keyboard, the one or more physical buttons having respective key codes; and transmitting data corresponding to the respective key codes of the one or more physical buttons from the physical keyboard to the computing system, wherein at least the receiving of the wirelessly transmitted password, the converting of the password into the series of corresponding key codes, and the transmitting of the data corresponding to the series of key codes from the physical keyboard to the computing system are performed without displaying the password.

16. The keyboard system of claim 15, further including a wireless or wired connection to the computing system.

* * * * *